US012414117B2

(12) United States Patent
Tang et al.

(10) Patent No.: US 12,414,117 B2
(45) Date of Patent: Sep. 9, 2025

(54) UPLINK TRANSMISSION BEAM SELECTION IN A SECONDARY CELL

(71) Applicant: Apple Inc., Cupertino, CA (US)

(72) Inventors: Yang Tang, Santa Clara, CA (US); Qiming Li, Beijing (CN); Yushu Zhang, Beijing (CN); Manasa Raghavan, Sunnyvale, CA (US); Xiang Chen, Campbell, CA (US); Huaning Niu, San Jose, CA (US); Dawei Zhang, Saratoga, CA (US); Hong He, San Jose, CA (US); Haitong Sun, Cupertino, CA (US); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,250

(22) PCT Filed: Aug. 4, 2021

(86) PCT No.: PCT/CN2021/110571
§ 371 (c)(1),
(2) Date: Feb. 9, 2023

(87) PCT Pub. No.: WO2023/010337
PCT Pub. Date: Feb. 9, 2023

(65) Prior Publication Data
US 2024/0032038 A1    Jan. 25, 2024

(51) Int. Cl.
*H04W 72/21*    (2023.01)
*H04B 7/024*    (2017.01)
(Continued)

(52) U.S. Cl.
CPC ........ *H04W 72/21* (2023.01); *H04B 7/06952* (2023.05); *H04W 16/28* (2013.01); *H04W 74/0833* (2013.01)

(58) Field of Classification Search
CPC . H04W 72/21; H04W 16/28; H04W 74/0833; H04W 52/0206; H04W 76/15;
(Continued)

(56) References Cited

U.S. PATENT DOCUMENTS 12,114,178 B2 * 10/2024 Matsumura ........... H04W 72/20
2017/0207845 A1 * 7/2017 Moon .................... H04B 7/088
(Continued)

FOREIGN PATENT DOCUMENTS

| CN | 109891773 A | 6/2019 |
| CN | 112753169 A | 5/2021 |

(Continued)

OTHER PUBLICATIONS

International Search Report for Application No. PCT/CN2021/110571 mailed Mar. 29, 2022, 3 pages.
(Continued)

*Primary Examiner* — Harry H Kim
(74) *Attorney, Agent, or Firm* — Sterne, Kessler, Goldstein & Fox P.L.L.C.

(57) ABSTRACT

A user equipment (UE) is provided to select an uplink transmission beam to communicate with a base station in a secondary cell of a carrier aggregation (CA) scheme. The UE can communicate with a first base station in a primary cell (PCell), and receive a command from the wireless network to activate a physical uplink control channel (PUCCH) transmission to a second base station in a secondary cell (SCell). The second base station can be in a being-activated state. The UE can determine whether an uplink spatial relation configuration is provided to the UE, and determine whether the UE supports beam correspondence. Based on the determinations, the UE can select an uplink transmission beam for the PUCCH transmission to the second base station.

20 Claims, 4 Drawing Sheets

(51) Int. Cl.

| | |
|---|---|
| *H04B 7/0404* | (2017.01) |
| *H04B 7/06* | (2006.01) |
| *H04L 5/00* | (2006.01) |
| *H04W 16/28* | (2009.01) |
| *H04W 52/02* | (2009.01) |
| *H04W 74/0833* | (2024.01) |
| *H04W 76/15* | (2018.01) |
| *H04W 76/27* | (2018.01) |

(58) Field of Classification Search
CPC ... H04W 76/27; H04B 7/06952; H04B 7/024; H04B 7/0404; H04B 7/06966; H04B 7/0695; H04L 5/001; H04L 5/0023; H04L 5/0032; H04L 5/0048; H04L 5/0091
See application file for complete search history.

(56) References Cited

U.S. PATENT DOCUMENTS

| | | | |
|---|---|---|---|
| 2018/0131434 A1 | 5/2018 | Islam et al. | |
| 2020/0112890 A1 | 4/2020 | Luo et al. | |
| 2020/0178239 A1 | 6/2020 | Yi et al. | |
| 2020/0259703 A1 | 8/2020 | Cirik et al. | |
| 2020/0266873 A1 | 8/2020 | Lim et al. | |
| 2021/0204255 A1* | 7/2021 | Huang | H04W 72/23 |
| 2021/0399785 A1* | 12/2021 | Sakhnini | H04W 72/02 |
| 2024/0121851 A1 | 4/2024 | Matsumura et al. | |
| 2024/0196406 A1* | 6/2024 | Jung | H04B 7/0695 |

FOREIGN PATENT DOCUMENTS

| | | |
|---|---|---|
| WO | WO 2021011442 A1 | 1/2021 |
| WO | WO 2021075521 A1 | 4/2021 |

OTHER PUBLICATIONS

Apple, "On PUCCH SCell activation and deactivation," 3GPP TSG-RAN4 Meeting #99-e, R4-2109310, May 27, 2021, 12 pages.
NTT Docomo, Inc., "Discussions on PUCCH SCell Activation/Deactivation delay requirements," 3GPP TSG-RAN WG4 Meeting #99-e, R4-2109545, May 27, 2021, 5 pages.
Qualcomm Incorporated, "Discussion on PUCCH SCell Activation," 3GPP TSG-RAN WG4 Meeting #99-e, R4-2108970, May 27, 2021, 7 pages.
Extended European Search Report directed to related European Application No. 21952238.0, mailed Mar. 19, 2025; 10 pages.
3GPP TS 38.321 V16.5.0 (Jun. 2021), 3rd Generation Partnership Project; Technical Specification Group Radio Access Network; NR; Medium Access Control (MAC) protocol specification (Release 16); 157 pages.

* cited by examiner

:::page
UPLINK TRANSMISSION BEAM SELECTION IN A SECONDARY CELL

BACKGROUND

This application is a U.S. National Phase of International Application No. PCT/CN2021/110571, filed Aug. 4, 2021, which is hereby incorporated by reference in its entirety.

Field

The described aspects generally relate to wireless communication systems, and particularly to the uplink transmission beam selection for a user equipment (UE) in a secondary cell of a wireless communication system.

Related Art

A wireless communication system can include a fifth generation (5G) system, a New Radio (NR) system, a long term evolution (LTE) system, a combination thereof, or some other wireless systems. In addition, a wireless communication system can support a wide range of use cases such as enhanced mobile broad band (eMBB), massive machine type communications (mMTC), ultra-reliable and low-latency communications (URLLC), and enhanced vehicle to anything communications (eV2X). Carrier aggregation (CA) is used in LTE-Advanced systems and beyond in order to increase the bandwidth and the bitrate of wireless communications. When CA is implemented, a user equipment (UE) can communicate with a first base station in a primary cell (PCell), and further communicate with a second base station in a secondary cell (SCell). It can be a challenge for a UE to efficiently perform operations for communications in the PCell and SCell.

SUMMARY

Some aspects of this disclosure relate to apparatuses and methods for implementing techniques for providing a user equipment (UE) to select an uplink transmission beam to communicate with a base station in a secondary cell of a carrier aggregation (CA) scheme. The implemented techniques can be applicable to many wireless systems, e.g., a wireless communication system based on 3rd Generation Partnership Project (3GPP) release 15 (Rel-15), release 16 (Rel-16), release 17 (Rel-17), or beyond.

Some aspects of this disclosure relate to a UE. The UE can include a transceiver having multiple uplink transmission beams configured to enable wireless communication in a wireless network, and a processor communicatively coupled to the transceiver. The UE can communicate with a first base station in a primary cell (PCell), and receive a command from the wireless network to activate a physical uplink control channel (PUCCH) transmission to a second base station in a secondary cell (SCell) of the wireless network. The second base station is in a being-activated state, which is not activated yet. The UE can determine whether an uplink spatial relation configuration is provided to the UE by the wireless network, and determine whether the UE supports beam correspondence. Afterwards, the UE can select an uplink transmission beam from the multiple uplink transmission beams of the UE for the PUCCH transmission to the second base station, based on the determination whether the uplink spatial relation configuration is provided to the UE, and whether the UE supports beam correspondence. Furthermore, the UE can transmit, using the selected uplink transmission beam, an uplink signal to the second base station. The uplink signal enables the second base station to enter an activated state.

According to some aspects, in response to the determination that the uplink spatial relation configuration is provided to the UE, and the determination that the UE supports beam correspondence, the UE can select the uplink transmission beam based on the uplink spatial relation configuration.

According to some aspects, in response to the determination that the uplink spatial relation configuration is provided to the UE by the wireless network, and the uplink spatial relation configuration indicates an uplink reference signal, the UE can select an uplink transmission beam associated with the uplink reference signal indicated by the uplink spatial relation configuration.

According to some aspects, in response to the determination that the UE does not support beam correspondence, the UE can select an uplink transmission beam of a random-access channel (RACH) from the UE to the second base station, or randomly select a transmission beam of the multiple uplink transmission beams of the UE, or select a transmission beam for the PCell or another activated SCell.

According to some aspects, in response to the determination that the uplink spatial relation configuration is not provided to the UE by the wireless network, the UE can determine whether a pathloss reference signal (PL-RS) configuration is provided to the UE by the wireless network, and select the uplink transmission beam based on a PL-RS downlink beam, in response to the determination that the PL-RS configuration is provided to the UE by the wireless network, and the UE supports beam correspondence.

According to some aspects, in response to the determination that UE supports beam correspondence, the PL-RS configuration is not provided by the wireless network, and the uplink spatial relation configuration is not provided by the wireless network, the UE can select an uplink transmission beam based on a synchronizations signal block (SSB) measurement.

According to some aspects, in response to a determination that a transmission configuration indicator (TCI) is configured for a physical downlink control channel (PDCCH), the determination that the UE supports beam correspondence, the PL-RS configuration is not provided by the wireless network, and the uplink spatial relation configuration is not provided by the wireless network, the UE can select the uplink transmission beam based on the TCI of the PDCCH.

According to some aspects, the UE can determine a PL-RS configuration is provided to the UE by the wireless network, and determine a transmission power for the PUCCH transmission to the second base station based on the PL-RS configuration.

According to some aspects, the UE can determine that a PL-RS configuration is not provided by the wireless network, and determine a transmission power for the PUCCH transmission to the second base station based on a transmission power of a random-access channel (RACH) from the UE to the second base station, an offset to the transmission power of the RACH, or a transmission power of a reference signal.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Carrier aggregation (CA) is used in a long term evolution (LTE)-Advanced system, a fifth generation (5G) system, a New Radio (NR) system, or other wireless systems in order to increase the bandwidth and the bitrate. When CA is implemented, a user equipment (UE) can communicate with a first base station in a primary cell (PCell), and further communicate with one or more base stations in secondary cells (SCell). A base station, such as a base station in a SCell, can be in various states, including an off state, an activated state, a being-activated state, and more.

A spatial relation for a UE can be configured between a received downlink (DL) reference signal and a transmitted uplink (UL) signal, or between two DL signals or two UL signals. For example, a spatial relation can be configured between two UL transmissions at the UE, such as a Sounding Reference Signal (SRS) and a physical uplink control channel (PUCCH). If a spatial relation is configured between a SRS and a PUCCH, the UE may transmit the PUCCH with the same antenna pattern, e.g. beam, that was previously used to transmit the associated SRS. Therefore, the base station receiver can infer the quality of a received PUCCH by measuring the SRS. In addition, the base station can use the same receive spatial filter/beam to receive PUCCH and SRS. Hence, the spatial relation framework can provide a mechanism for the network to steer the UL transmission to improve the reception quality at a base station. In some embodiments, a list of spatial relations can be configured for the UL transmissions. In the current disclosure, a spatial relation can be referred to as an uplink spatial relation as well.

In some embodiments, a UE may not have an uplink spatial relation configuration provided by the network. In addition, the use of the spatial relation features relies on UE support for beam correspondence, where the receiving and transmitting chains at the UE are calibrated so that the UE can transmit in the same direction as it has received a DL signal. Hence, in some embodiments, even if an uplink spatial relation configuration is provided, the UE may not be able to perform the provided uplink spatial relation configuration. Current technology does not provide a solution for a UE to select an uplink transmission beam for the PUCCH transmission with respect to an uplink spatial relation configuration. This poses a particular challenge for the UE to select an uplink transmission beam when a base station in a SCell is not in an activate state where not all functions of the base station are activated.

Some aspects of this disclosure provide mechanisms for a UE to select an uplink transmission beam from multiple uplink transmission beams of the UE for the PUCCH transmission to a base station in a SCell, based on the determination whether the uplink spatial relation configuration is provided to the UE, and whether the UE supports beam correspondence. A UE can be configured to communicate with a first base station in a PCell, and receive a command from a wireless network to activate a PUCCH transmission to a second base station in a SCell, where the second base station is in a being-activated state. The UE can determine, whether an uplink spatial relation configuration is provided to the UE by the wireless network, and whether the UE supports beam correspondence. Afterwards, the UE can select an uplink transmission beam from multiple uplink transmission beams of the UE for the PUCCH transmission to the second base station, based on the determination whether the uplink spatial relation configuration is provided to the UE, and whether the UE supports beam correspondence. The UE can further transmit, using the selected uplink transmission beam, an uplink signal to the second base station in the SCell. The uplink signal enables the second base station to enter an activated state from the being-activated state.

Figure 1:
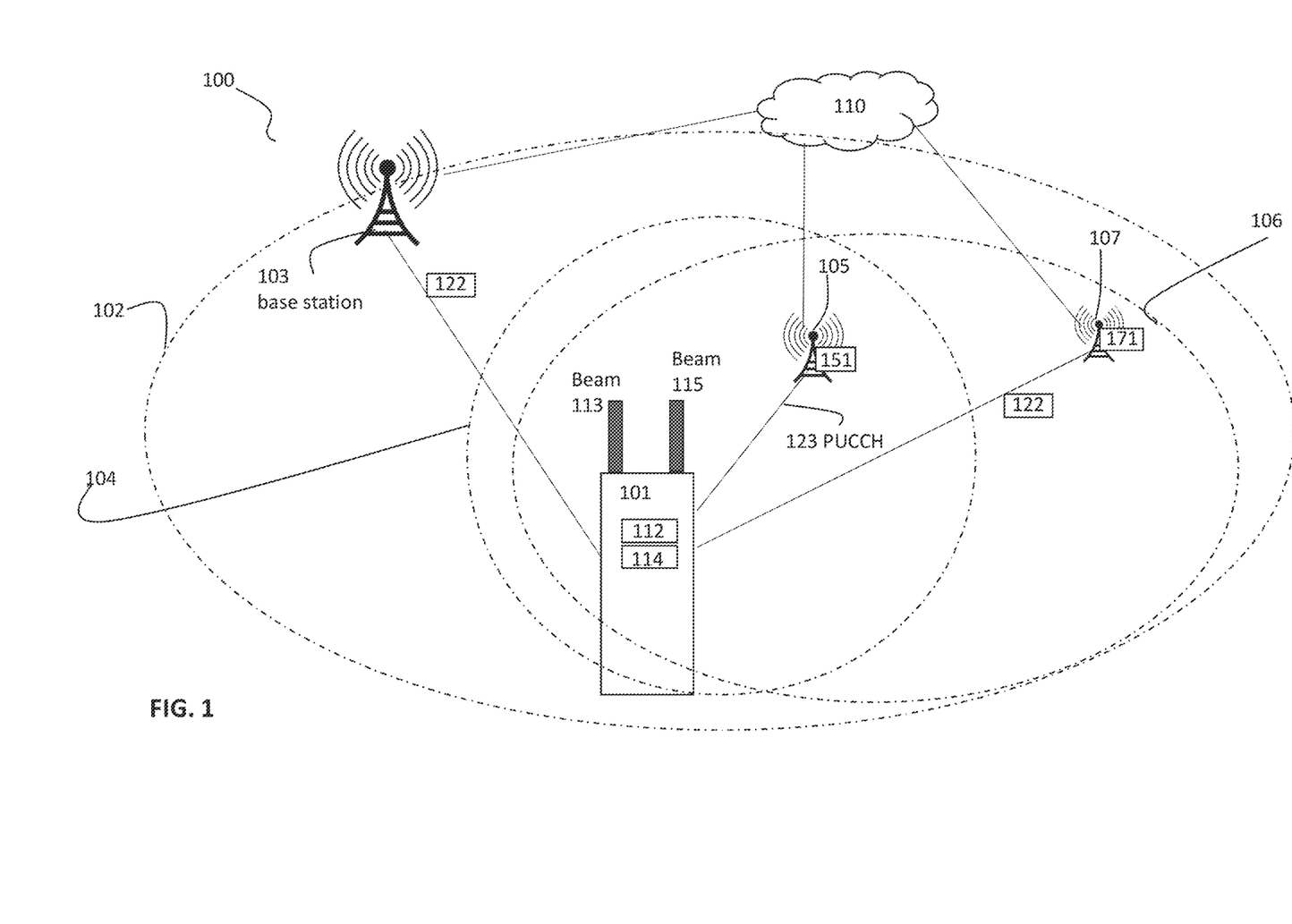
FIG. 1 illustrates a wireless system including a user equipment (UE) to select an uplink transmission beam for an uplink transmission to a base station in a secondary cell (SCell), according to some aspects of the disclosure.

FIG. 1 illustrates a wireless system 100 including a UE 101 to select an uplink transmission beam for an uplink transmission to a base station in a SCell, according to some aspects of the disclosure. Wireless system 100 is provided for the purpose of illustration only and does not limit the disclosed aspects. Wireless system 100 can include, but is not limited to, UE 101, a base station 103, a base station 105, and a base station 107, all communicatively coupled to a core network 110. There can be other network entities, e.g., network controller, a relay station, not shown. A wireless system can be referred to as a wireless network, a wireless communication system, or some other names known to a person having ordinary skill in the art.

In some examples, wireless system 100 can be a NR system, a LTE system, a 5G system, or some other wireless system. In addition, wireless system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, base station 103, base station 105, base station 107 can be a fixed station or a mobile station. Base station 103, base station 105, base station 107 can also be called other names, such as a base transceiver system (BTS), an access point (AP), a transmission/reception point (TRP), an evolved NodeB (eNB), a next generation node B (gNB), a 5G node B (NB), or some other equivalent terminology.

According to some aspects, UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 103 can provide wireless coverage for a cell 102, while base station 105 can provide wireless coverage for a cell 104 contained within cell 102, and base station 107 can provide wireless coverage for a cell 106 contained within cell 102. In some other embodiments, cell 102 can overlap partially with cell 104 and cell 106. Cell 102, cell 104, and cell 106 can be a macro cell, a pico cell, a femto cell, and/or another type of cell. For comparison, a macro cell can cover a relatively large geographic area, e.g., several kilometers in radius, a femto cell can cover a relatively small geographic area, e.g., a home, while a pico cell covers an area smaller than the area covered by a macro cell but larger than the area covered by a femto cell. For example, cell 102 can be a macro cell, while cell 104 and cell 106 can be a pico cell or a femto cell. In addition, cell 102 can be a pico cell, while cell 104 and cell 106 can be a femto cell. In some examples, the geographic area of a cell can move according to the location of a mobile base station. In some examples, base station 103, base station 105, and base station 107 can be interconnected to one another and/or to other base station or network nodes in a network through various types of backhaul interfaces such as a direct physical connection, a virtual network, and/or the like, not shown.

According to some aspects, wireless system 100 can be a wireless system having carrier aggregation (CA). Cell 102 can be a PCell, while cell 104 and cell 106 can be a SCell to UE 101. There can be other kinds of cells, such as primary secondary cell, not shown in FIG. 1. UE 101 can include a transceiver having multiple transmission beams, e.g., a transmission beam 113, a transmission beam 115, configured to enable wireless communication in wireless system 100. UE 101 can communicate with base station 103 in cell 102, which is a PCell, and receive a command 122 from the wireless network, e.g., base station 103, to activate a PUCCH transmission 123 to base station 105 in cell 104, which is SCell. Base station 105 can have a state 151, which can be in a being-activated state, or an activated state that is different from the being-activated state. Once base station 105 receives the PUCCH transmission 123, base station 105 can change state 151 to the activated state from the being-activated state or an inactive state. Additionally and alternatively. UE 101 can receive command 122 from base station 107 in cell 106, which is a SCell, where base station 107 can have a state 171 being in an activated state.

According to some aspects, UE 101 can determine whether an uplink spatial relation configuration 112 is provided to UE 101 by the wireless system 100, and determine whether the UE supports beam correspondence 114. In some embodiments, the uplink spatial relation configuration 112 can be provided by base station 103 in the PCell, or base station 107 in an activated SCell, or a primary secondary cell. In some embodiments, the uplink spatial relation configuration 112, which can be a spatial setting for a PUCCH transmission, can be provided by PUCCH-SpatialRelationInfo if UE 101 is configured with a single value of pucch-SpatialRelationInfoId. Otherwise, if UE 101 is provided multiple values for PUCCH-SpatialRelationInfo, UE 101 can determine a spatial setting for the PUCCH transmission as described in a related technical standard document, such as TS 38.321 developed by 3GPP standard. UE 101 can apply corresponding actions described in the technical standard and a corresponding setting for a spatial domain filter to transmit PUCCH in a time slot described by the technical standard. In some embodiments, a spatial setting for a PUCCH transmission from UE 101 can be the same as a spatial setting for PDCCH receptions by UE 101 in the CORESET with the lowest identifier (ID) on the active downlink BWP of the PCell. For a PUCCH transmission over multiple slots, a same spatial setting can be applied to the PUCCH transmission in each of the multiple slots.

Afterwards, UE 101 can select an uplink transmission beam from the multiple transmission beams of the UE for the PUCCH transmission to the second base station, based on the determination whether the uplink spatial relation configuration is provided to the UE, and whether the UE supports beam correspondence. For example, UE 101 can select uplink transmission beam 113, not uplink transmission beam 115, for the PUCCH transmission 123 to base station 105, because transmission beam 113 is the same beam used for downlink from base station 103. Furthermore, UE 101 can transmit, using the selected uplink transmission beam 113, an uplink signal, e.g., PUCCH transmission 123, to base station 105. Base station 105 and cell 104 can be referred to be a target SCell since cell 104 and base station 105 is in the being-activated state, and is going to be completely activated. The uplink signal. e.g., PUCCH transmission 123, can enable base station 105 to enter an activated state.

Figure 2:
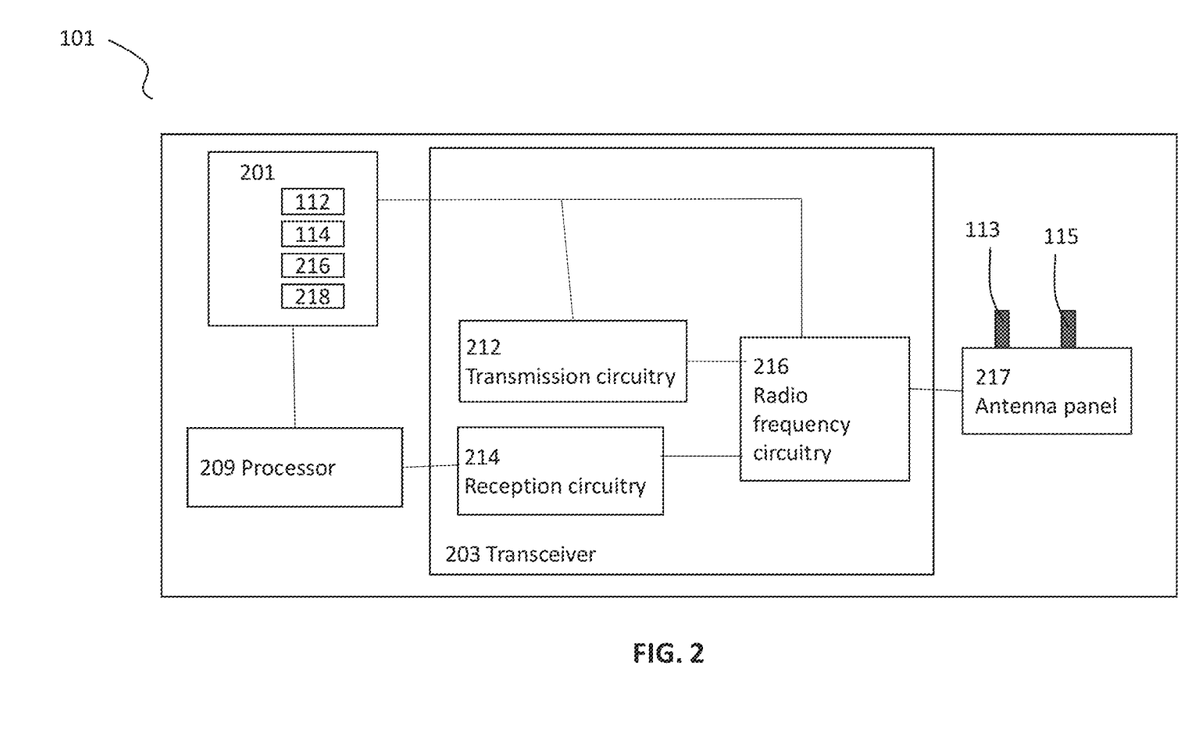
FIG. 2 illustrates a block diagram of a UE including a transceiver having multiple uplink transmission beams, according to some aspects of the disclosure.

According to some aspects, UE 101 can be implemented according to a block diagram as illustrated in FIG. 2. Referring to FIG. 2, UE 101 can have antenna panel 217 including one or more antenna elements to form various transmission beams, e.g., transmission beam 113 and transmission beam 115, coupled to a transceiver 203 and controlled by a processor 209. Transceiver 203 and antenna panel 217 (using transmission beam 113 and transmission beam 115) can be configured to enable wireless communication in a wireless network. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 209 can be communicatively coupled to a memory 201, which are further coupled to the transceiver 203. Various data can be stored in memory 201. In some examples, memory 201 can store uplink spatial relation configuration 112 if such an uplink spatial relation configuration is provided by the network, beam correspondence 114 if it is supported by UE 101, or other information.

In some embodiments, memory 201 can include instructions, that when executed by the processor 209 perform operations described herein, e.g., operations for selecting an uplink transmission beam from multiple uplink transmission beams of UE 101 for the PUCCH transmission 123 to base station 105. Alternatively, the processor 209 can be "hard-coded" to perform the uplink transmission beam selection functions described herein.

In some embodiments, processor 209 can be configured to communicate with base station 101 in a PCell, e.g., cell 102, and receive command 122 from a wireless network to activate a PUCCH transmission 123 to base station 105 in a SCell, e.g., cell 104. Base station 105 can be in a being-activated state. Processor 209 can be configured to determine whether an uplink spatial relation configuration 112 is provided to UE 101 by the wireless network, and determine whether the UE supports beam correspondence 114. The uplink spatial relation configuration 112 can be provided by base station 101 in the PCell, or base station 107 in an activated SCell, or a primary secondary cell, not shown. Afterwards, processor 209 can be configured to select an uplink transmission beam from the multiple transmission beams of UE 101 for the PUCCH transmission 123 to base station 105, based on the determination of whether the uplink spatial relation configuration is provided to the UE, and whether the UE supports beam correspondence. Furthermore, processor 209 can be configured to transmit, using the selected uplink transmission beam, an uplink signal, e.g., PUCCH transmission 123, to base station 105. The uplink signal can enable base station 105 to enter an activated state.

According to some aspects, based on a determination that the uplink spatial relation configuration 112 is provided to UE 101 by the wireless network, and UE 101 supports beam correspondence 14, processor 209 can be configured to select the uplink transmission beam based on the uplink spatial relation configuration.

According to some aspects, based on a determination the uplink spatial relation configuration 112 is provided to UE 101 by the wireless network, and the uplink spatial relation configuration 112 indicates an uplink reference signal, processor 209 can be configured to select an uplink transmission beam associated with the uplink reference signal indicated by the uplink spatial relation configuration.

According to some aspects, in response to the determination that UE 101 does not support beam correspondence, processor 209 can be configured to select an uplink transmission beam of a random-access channel (RACH) from UE 101 to base station 105, or randomly select a transmission beam of the multiple uplink transmission beams of UE 101, or select a transmission beam for the PCell or another activated SCell. Additionally and alternatively, UE 101 can perform beam sweeping for the PUCCH transmission in the SCell, e.g., cell 104. In other words, UE 101 can try some or all local transmission beams for PUCCH transmission 123 for cell 104. When UE 101 is incapable of beam correspondence, UE 101 can trigger RACH to the SCell, and the uplink transmission beam for PUCCH transmission on the SCell can be the one that UE 101 used to successfully send RACH to base station 105 in the SCell (received RAR after RACH).

According to some aspects, in response to a determination that the uplink spatial relation configuration is not provided to UE 101 by the wireless network, processor 209 can be configured to determine whether a pathloss reference signal (PL-RS) configuration 216 is provided to UE 101 by the wireless network, and select the uplink transmission beam based on a PL-RS downlink beam, in response to the determination that the PL-RS configuration 216 is provided to UE 101 by the wireless network, and UE 101 supports beam correspondence.

According to some aspects, in response to a determination that: UE 101 supports beam correspondence 114, the PL-RS configuration is not provided by the wireless network, and the uplink spatial relation configuration is not provided by the wireless network, processor 209 can be configured to select an uplink transmission beam based on a synchronizations signal block (SSB) measurement 218.

According to some aspects, in response to a determination that: a transmission configuration indicator (TCI) is configured for a physical downlink control channel (PDCCH), the determination that UE 101 supports beam correspondence, the PL-RS configuration is not provided by the wireless network, and the uplink spatial relation configuration is not provided by the wireless network, processor 209 can be configured to select the uplink transmission beam based on the TC of the PDCCH.

In some embodiments, an uplink transmission beam for the PUCCH transmission from the UE can correspond to the receiving beam for PDCCH receptions by the UE in the CORESET with the lowest ID on the first active DL BWP of the being activated SCell, e.g. cell 104. In some embodiments, an uplink transmission beam for the PUCCH transmission from the UE can correspond to the receiving beam for PDCCH receptions by the UE in the CORESET of one active serving cell which is QCLed with the PDCCH of target SCell, e.g., cell 104.

In some embodiments, an uplink transmission beam for the PUCCH transmission from the UE 101 to base station 105 on cell 104, e.g., the target SCell, can be the same as the uplink transmission beam for PUCCH transmission on other active serving cell, e.g., cell 106.

In some embodiments, UE 101 can use the uplink transmission beam of RACH to the being-activated SCell for the PUCCH transmission if the RACH is needed during the PUCCH SCell activation (the TA info is not valid). In some embodiments, UE 101 can use the best receiving beam based on the SSB measurement to derive the uplink spatial information (uplink transmission beam) based on beam correspondence for PUCCH transmission on target SCell. The best receiving beam means the receiving beam UE 101 used to get the strongest SSB of target SCell during DL synchronization.

In some embodiments. UE 101 can trigger RACH to the target SCell, and the uplink transmission beam for PUCCH transmission on the target SCell can be the one that UE 101 used to successfully RACH to SCell (received RAR after RACH).

According to some aspects, processor 209 can be configured to determine the PL-RS configuration 216 is provided to UE 101 by the wireless network, and determine a transmission power for the PUCCH transmission to the second base station based on the PL-RS configuration.

According to some aspects, processor 209 can be configured to determine that a PL-RS configuration is not provided by the wireless network, and determine a transmission power for the PUCCH transmission to base station 105 based on a transmission power of a random-access channel (RACH) from UE 101 to base station 105, an offset to the transmission power of the RACH, or a transmission power of a reference signal.

In some embodiments, UE 101 may use the RACH transmission power to determine the power for PUCCH transmission if the RACH is needed during the PUCCH SCell activation (the TA info is not valid). In some embodiments, UE 101 can use the RACH transmission power with a power offset to determine the power for PUCCH transmission if the RACH is needed during the PUCCH SCell activation (the TA info is not valid). The power offset can be configured by network, or hard-coded in the specification. In some embodiments, UE 101 can trigger a RACH to the target SCell, and then UE 101 can determine the target SCell PUCCH transmission power. In some embodiments, UE 101 can use the target SCell SSB to determine the power for the PUCCH transmission on the target being-activated SCell. The SSB selected can be the strongest SSB measured by UE 101, or associated SSB with the RACH if a RACH is used on the target SCell. In some embodiments, UE 101 can use the reference signal in the TCI of the PDCCH of target SCell to determine power for PUCCH transmission on target being-activated SCell. In some embodiments, UE 101 can use the reference signal in the uplink spatial relation of the target PUCCH to determine the power for the PUCCH transmission on the target being-activated SCell. If the uplink spatial relation of the target PUCCH transmission is a DL reference signal, UE 101 can use this DL reference signal for pathloss estimation to determine the target PUCCH transmission power. If the uplink spatial relation of the target PUCCH is a UL reference signal. UE 101 can use this UL reference signal transmission power for the target PUCCH transmission power, or use this UL reference signal transmission power with a power offset for the target PUCCH transmission power. The power offset can be configured by the wireless network, or hard-coded in the specification.

Figure 3:
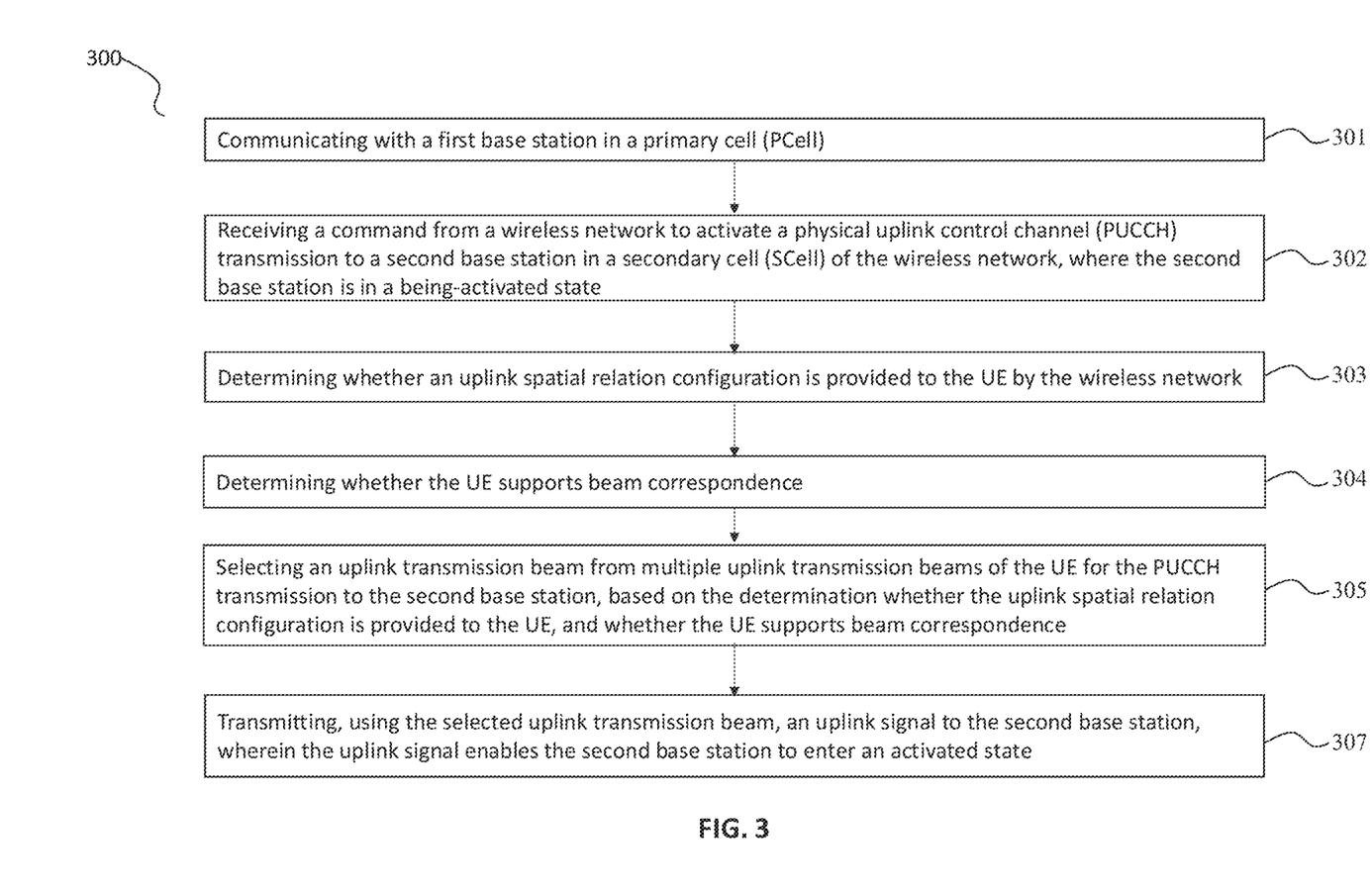
FIG. 3 illustrates an example process performed by a UE for selecting an uplink transmission beam for an uplink transmission to a base station in a SCell, according to some aspects of the disclosure.

FIG. 3 illustrates an example process 300 performed by a UE for selecting an uplink transmission beam for an uplink transmission to a base station in a SCell, according to some aspects of the disclosure. According to some aspects, as shown in FIG. 3, method 300 can be performed by UE 101 to select an uplink transmission beam for an uplink transmission to a base station in a SCell, e.g., base station 105 in cell 104.

At 301, UE 101 communicates with a first base station in a PCell. For example, as shown in FIG. 1, UE 101 communicates with base station 103 in a PCell, e.g., cell 102.

At 302, UE 101 can receive a command from a wireless network to activate a PUCCH transmission to a second base station in a SCell of the wireless network, where the second base station is in a being-activated state. For example, as shown in FIG. 1, UE 101 can receive command 122 from a wireless network to activate PUCCH transmission 123 to base station 105 in cell 104, which is a SCell of the wireless network. Base station 105 can be in a being-activated state.

At 303, UE 101 can determine whether an uplink spatial relation configuration is provided to the UE by the wireless network. For example, as shown in FIG. 1, UE 101 can determine whether an uplink spatial relation configuration 112 is provided to UE 101 by the wireless network.

At 304, UE 101 can determine whether the UE supports beam correspondence. For example, as shown in FIG. 1, UE 101 can determine whether UE 101 supports beam correspondence 114.

At 305, UE 101 can select an uplink transmission beam from multiple uplink transmission beams of the UE for the PUCCH transmission to the second base station, based on the determination whether the uplink spatial relation configuration is provided to the UE, and whether the UE supports beam correspondence. For example, as shown in FIG. 1, UE 101 can select an uplink transmission beam from multiple uplink transmission beams of UE 101 for the PUCCH transmission 123 to base station 105, based on the determination whether the uplink spatial relation configuration 112 is provided to UE 101, and whether UE 101 supports beam correspondence 114.

At 307, UE 101 can transmit, using the selected uplink transmission beam, an uplink signal to the second base station, wherein the uplink signal enables the second base station to enter an activated state. For example, as shown in FIG. 1, UE 101 can transmit, using the selected uplink transmission beam, PUCCH transmission 123 to base station 105. After receiving PUCCH transmission 123, base station 105 enters an activated state.

Figure 4:
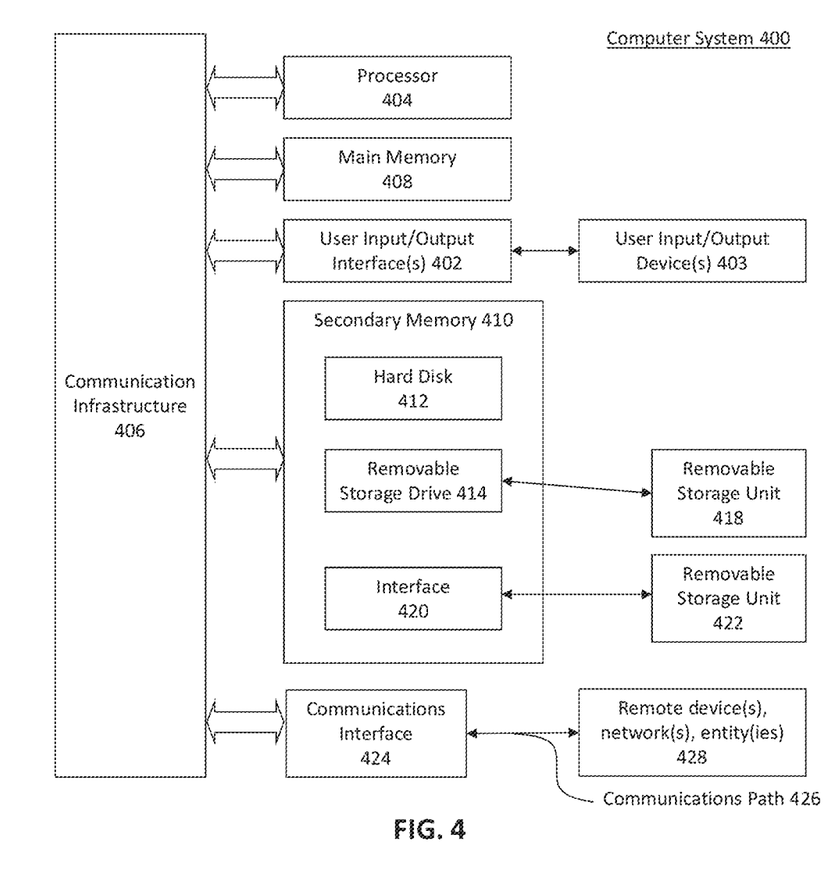
FIG. 4 is an example computer system for implementing some aspects or portion(s) thereof of the disclosure provided herein.

Various aspects can be implemented, for example, using one or more computer systems, such as computer system 400 shown in FIG. 4. Computer system 400 can be any computer capable of performing the functions described herein such as UE 101, base station 103, base station 105, or base station 107 as shown in FIG. 1 and FIG. 2, for operations described for processor 209 or process 300. Computer system 400 includes one or more processors (also called central processing units, or CPUs), such as a processor 404. Processor 404 is connected to a communication infrastructure 406 (e.g., a bus). Computer system 400 also includes user input/output device(s) 403, such as monitors, keyboards, pointing devices, etc., that communicate with communication infrastructure 406 through user input/output interface(s) 402. Computer system 400 also includes a main or primary memory 408, such as random access memory (RAM). Main memory 408 may include one or more levels of cache. Main memory 408 has stored therein control logic (e.g., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to some aspects, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 408, the removable storage unit 418, the removable storage unit 422 can store instructions that, when executed by processor 404, cause processor 404 to perform operations for a UE or a base station, e.g., UE 101, base station 103, or base station 105 as shown in FIG. 1 and FIG. 2. In some examples, the operations include those operations illustrated and described in FIGS. 3-4.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426. Operations of the communication interface 424 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 400, main memory 408, secondary memory 410 and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 4. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of personal information data will comply with well-established privacy policies and/or privacy practices. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method for wireless communications by a user equipment (UE), comprising:
  communicating with a first base station in a primary cell (PCell);

receiving a command from a wireless network to activate a physical uplink control channel (PUCCH) transmission to a second base station in a secondary cell (SCell) of the wireless network;
determining whether an uplink spatial relation configuration is provided to the UE by the wireless network;
determining whether the UE supports beam correspondence;
selecting an uplink transmission beam from multiple uplink transmission beams of the UE for the PUCCH transmission to the second base station, based on the determination whether the uplink spatial relation configuration is provided to the UE, and whether the UE supports the beam correspondence; and
transmitting, using the selected uplink transmission beam, an uplink signal to the second base station, wherein the uplink signal enables the second base station to enter an activated state.

2. The method of claim 1, wherein, in response to a determination that the uplink spatial relation configuration is provided to the UE by the wireless network, and a determination that the UE supports the beam correspondence, the selecting the uplink transmission beam comprises selecting the uplink transmission beam based on the uplink spatial relation configuration provided to the UE.

3. The method of claim 1, wherein, in response to a determination that the uplink spatial relation configuration is provided to the UE by the wireless network, the selecting the uplink transmission beam comprises selecting an uplink transmission beam associated with an uplink reference signal indicated by the uplink spatial relation configuration.

4. The method of claim 1, wherein, in response to a determination that the UE does not support the beam correspondence, the selecting the uplink transmission beam comprises:
selecting an uplink transmission beam of a random-access channel (RACH) from the UE to the second base station;
randomly selecting a transmission beam of the multiple uplink transmission beams of the UE;
selecting a transmission beam associated with the PCell, a primary secondary cell (PSCell), or another activated SCell; or
selecting a transmission beam associated with a UE-triggered RACH transmission that has a RACH response received from the wireless network, wherein the UE-triggered RACH transmission is triggered by the UE to the second base station of the SCell.

5. The method of claim 1, wherein, in response to a determination that the uplink spatial relation configuration is not provided to the UE by the wireless network and a determination that the UE supports the beam correspondence, the method further comprising:
determining whether a pathloss reference signal (PL-RS) configuration is provided to the UE by the wireless network; and
selecting the uplink transmission beam based on a PL-RS downlink beam indicated in the PL-RS configuration, in response to the PL-RS configuration being provided to the UE by the wireless network.

6. The method of claim 5, wherein, in response to a determination that the PL-RS configuration is not provided by the wireless network, the method further comprising:
selecting the uplink transmission beam based on a synchronizations signal block (SSB) measurement.

7. The method of claim 5, in response to a determination that the PL-RS configuration is not provided by the wireless network, and a determination that a transmission configuration indicator (TCI) is configured for a physical downlink control channel (PDCCH), the method further comprising:
selecting the uplink transmission beam based on the TCI of the PDCCH.

8. The method of claim 1, further comprising:
determining a pathloss reference signal (PL-RS) configuration is provided to the UE by the wireless network; and
determining a transmission power for the PUCCH transmission to the second base station based on the PL-RS configuration.

9. The method of claim 1, further comprising:
determining a pathloss reference signal (PL-RS) configuration is not provided by the wireless network; and
determining a transmission power for the PUCCH transmission to the second base station based on a transmission power of a random-access channel (RACH) from the UE to the second base station, an offset to the transmission power of the RACH, or a transmission power of a reference signal specified in the uplink spatial relation configuration.

10. The method of claim 1, determining whether the uplink spatial relation configuration is provided by the wireless network comprises determining whether the uplink spatial relation configuration is received from the first base station in the PCell, or a third base station in an activated SCell, or a primary secondary cell (PSCell).

11. A user equipment (UE), comprising:
a transceiver configured to enable wireless communication over a wireless network using multiple uplink transmission beams; and
a processor communicatively coupled to the transceiver and configured to:
communicate with a first base station in a primary cell (PCell);
receive a command from the wireless network to activate a physical uplink control channel (PUCCH) transmission to a second base station in a secondary cell (SCell) of the wireless network;
determine whether an uplink spatial relation configuration is provided to the UE by the wireless network;
determine whether the UE supports beam correspondence;
select an uplink transmission beam from the multiple uplink transmission beams of the UE for the PUCCH transmission to the second base station, based on the determination of whether the uplink spatial relation configuration is provided to the UE, and whether the UE supports the beam correspondence; and
transmit, using the selected uplink transmission beam, an uplink signal to the second base station, wherein the uplink signal enables the second base station to enter an activated state.

12. The UE of claim 11, wherein, in response to a determination that the uplink spatial relation configuration is provided to the UE by the wireless network, and a determination that the UE supports the beam correspondence, the processor is further configured to select the uplink transmission beam based on the uplink spatial relation configuration provided by the wireless network.

13. The UE of claim 11, wherein, in response to a determination that the uplink spatial relation configuration is provided to the UE by the wireless network, the processor is further configured to select an uplink transmission beam associated with an uplink reference signal indicated by the uplink spatial relation configuration.

14. The UE of claim 11, wherein, in response to a determination that the UE does not support the beam correspondence, the processor is further configured to:
  select an uplink transmission beam of a random-access channel (RACH) from the UE to the second base station;
  randomly select a transmission beam of the multiple uplink transmission beams of the UE;
  selecting a transmission beam associated with the PCell, a primary secondary cell (PSCell), or another activated SCell; or
  selecting a transmission beam associated with a UE-triggered RACH transmission that has a RACH response received from the wireless network, wherein the UE-triggered RACH transmission is triggered by the UE to the second base station of the SCell.

15. The UE of claim 11, wherein, in response to a determination that the uplink spatial relation configuration is not provided to the UE by the wireless network, and a determination that the UE supports the beam correspondence, the processor is further configured to:
  determine whether a pathloss reference signal (PL-RS) configuration is provided to the UE by the wireless network; and
  select the uplink transmission beam based on a PL-RS downlink beam, in response to the determination that the PL-RS configuration is provided to the UE by the wireless network.

16. The UE of claim 15, wherein, in response to a determination that the UE supports the beam correspondence, and the PL-RS configuration is not provided by the wireless network, the processor is further configured to:
  select the uplink transmission beam based on a synchronizations signal block (SSB) measurement.

17. The UE of claim 15, wherein, in response to a determination that the PL-RS configuration is not provided by the wireless network, and a determination that a transmission configuration indicator (TCI) is configured for a physical downlink control channel (PDCCH), the processor is further configured to:
  select the uplink transmission beam based on the TCI of the PDCCH.

18. The UE of claim 11, wherein the processor is further configured to:
  determine a pathloss reference signal (PL-RS) configuration is provided to the UE by the wireless network; and
  determine a transmission power for the PUCCH transmission to the second base station based on the PL-RS configuration.

19. A non-transitory computer-readable medium storing instructions that, when executed by a processor of a user equipment (UE), cause the UE to perform operations, the operations comprising:
  communicating with a first base station in a primary cell (PCell);
  receiving a command from a wireless network to activate a physical uplink control channel (PUCCH) transmission to a second base station in a secondary cell (SCell) of the wireless network;
  determining whether an uplink spatial relation configuration is provided to the UE by the wireless network;
  determining whether the UE supports beam correspondence;
  selecting an uplink transmission beam from multiple uplink transmission beams of the UE for the PUCCH transmission to the second base station, based on the determination whether the uplink spatial relation configuration is provided to the UE, and whether the UE supports the beam correspondence; and
  transmitting, using the selected uplink transmission beam, an uplink signal to the second base station, wherein the uplink signal enables the second base station to enter an activated state.

20. The non-transitory computer-readable medium of claim 19, wherein, in response to a determination that the uplink spatial relation configuration is provided to the UE by the wireless network, and a determination that the UE supports the beam correspondence, the selecting the uplink transmission beam comprises selecting the uplink transmission beam based on the uplink spatial relation configuration provided to the UE by the wireless network.

* * * * *